United States Patent
Kerns et al.

Patent Number: 6,154,460
Date of Patent: Nov. 28, 2000

[54] DATA PACKET TRANSMISSION SYSTEM AND METHOD

[75] Inventors: Daniel J. Kerns; Thomas A. Potter, both of Petaluma; Patrick K. Walp, Penngrove, all of Calif.

[73] Assignee: Alcatel USA Sourcing, L.P., Plano, Tex.

[21] Appl. No.: 08/866,884

[22] Filed: May 30, 1997

[51] Int. Cl.[7] .................................................. H04L 12/56
[52] U.S. Cl. ........................ 370/398; 370/395; 370/409
[58] Field of Search .................................... 370/351, 382, 370/395, 397, 398, 399, 383, 409, 375, 378, 379, 474, 392, 389; 711/147, 209, 130, 205

[56] References Cited

U.S. PATENT DOCUMENTS

| | | | |
|---|---|---|---|
| 5,136,584 | 8/1992 | Hedlund | 370/474 |
| 5,557,609 | 9/1996 | Shobatake | 370/395 |
| 5,740,448 | 4/1998 | Gentry | 711/130 |
| 5,751,951 | 5/1998 | Osborne | 709/250 |
| 5,812,527 | 9/1998 | Kline et al. | 370/232 |
| 5,815,501 | 9/1998 | Gaddis et al. | 370/402 |
| 5,860,149 | 1/1999 | Fiacco | 711/209 |
| 5,870,394 | 2/1999 | Oprea | 370/392 |
| 5,920,561 | 7/1999 | Daniel | 370/395 |
| 5,936,956 | 8/1999 | Naven | 370/395 |
| 5,951,654 | 9/1999 | Avsan | 370/392 |

*Primary Examiner*—Chi H. Pham
*Assistant Examiner*—Steven Nguyen
*Attorney, Agent, or Firm*—Fliesler Dubb Meyer & Lovejoy LLP

[57] ABSTRACT

A data packet transmission system is disclosed. The system comprises a processor (178) having a memory block (202) and a communication controller (204). The processor (178) stores a data packet (205), a buffer descriptor array (206), and a header (208) in the memory block (202). The buffer descriptor array (206) has a first plurality of elements (206b, 206d, 206f, 206h, 206i), each indicating a respective segment (205a–205e) of the data packet (206), and a second plurality of elements (206a, 206c, 206e, 206g), each indicating the header (208). The processor (178) supplies the location of the buffer descriptor array (206) to the communication controller (204). In response, the communication controller (204) transmits a plurality of cells (222, 224, 226, 228), each cell including the header (208) and a segment of the data packet (205), to a destination system (180).

14 Claims, 3 Drawing Sheets

DATA PACKET TRANSMISSION SYSTEM AND METHOD

TECHNICAL FIELD OF THE INVENTION

This invention relates generally to the field of telecommunications switching, and more particularly to a data packet transmission system and method.

BACKGROUND OF THE INVENTION

In a digital telecommunications switching system, formatted data packets are transmitted between a variety of locations. One possible originating point for data packets is a microprocessor. Traditionally, the microprocessor has comprised a memory block and a communication controller. A data packet generated by the microprocessor is typically written into a region of the memory block. To conform to industry-standard ATM Adaptation Layer 5 (AAL5) requirements, the packet must be segmented prior to being transmitted to a destination. According to known data packet transmission methods, this segmentation is accomplished by copying segments of the data packet into different regions of the memory block, and combining each segment with an ATM cell header containing destination information for the segment. The individual segments are then transmitted by the communication controller to a destination system, such as an ATM switch, from which the segments are routed to a final destination.

This data packet transmission method involves duplicating the data packet in the memory block, thereby consuming more memory than necessary. Moreover, duplication of data packet segments and triggering of the communication controller to individually transmit the segments uses large amounts of the microprocessor's processing time. Therefore, it is desirable to avoid duplicating the data packet during processing and transmission.

SUMMARY OF THE INVENTION

From the foregoing, it may be appreciated that a need has arisen for a data packet transmission system that avoids unnecessary consumption of memory space and processing time. In accordance with the present invention, a data packet transmission system and method are provided which substantially eliminate or reduce disadvantages and problems associated with conventional data packet transmission techniques.

According to an embodiment of the present invention, there is provided a data packet transmission system that includes a processor having a memory block and a communication controller. The processor stores a data packet, a buffer descriptor array, and a header in the memory block. The buffer descriptor array comprises a first plurality of elements, each indicating a respective segment of the data packet, and a second plurality of elements, each indicating the header. The processor supplies a signal indicating a location of the buffer descriptor array to the communication controller. In response to receiving the signal, the communication controller transmits the data packet to a destination system.

The present invention provides various technical advantages over conventional data packet transmission techniques. For example, one technical advantage is that no additional copies of the data packet are created in the memory block. Another technical advantage is that the communication controller performs the processing necessary to transmit the data packet, saving valuable processing time for the rest of the processor. Other examples are readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
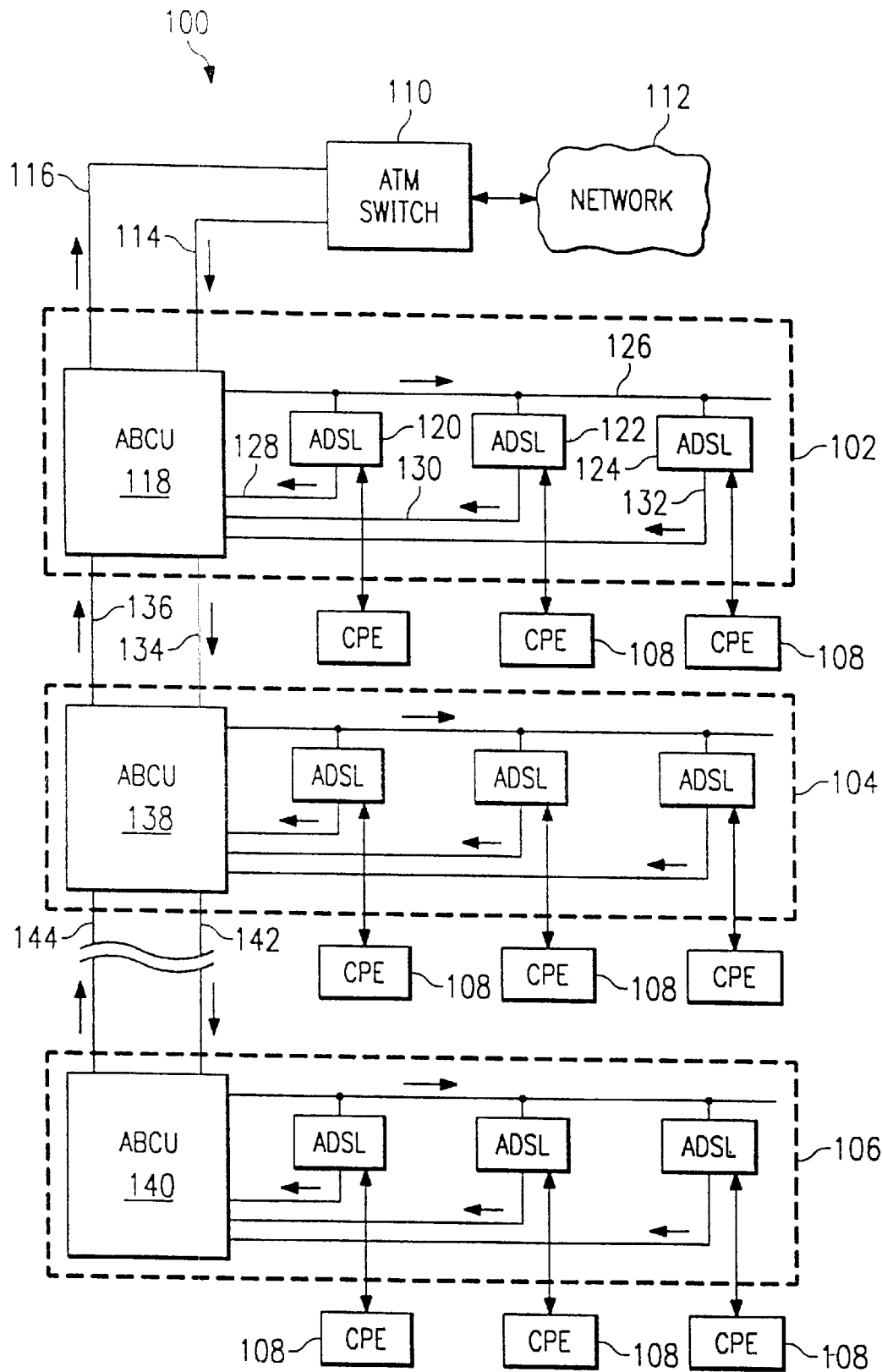
FIG. 1 is a block diagram of a distributed switching system.

Referring to FIG. 1, a distributed telecommunications switching system 100 is shown. Switching system 100 comprises a plurality of switching subsystems 102, 104, and 106, referred to as channel banks. Each channel bank provides data and/or voice communication services to a plurality of customer premises equipment (CPE) units 108. A primary channel bank 102 communicates with a data packet switch 110, such as an asynchronous transfer mode (ATM) switch 110, which in turn communicates with a telecommunications network 112. ATM switch 110 may, for example, be located at a telephone company central ooffice one or more intermediate channel banks 104 may be positioned between primary channel bank 102 and a terminating channel bank 106.

In the preferred embodiment described herein, the primary function of switching system 100 is to route data packets in the well known ATM cell format from ATM switch 110 to individual CPE units 108 and to carry ATM cells from CPE units 108 to ATM switch 110. Together, ATM switch 110 and switching system 100 provide communication paths between CPE units 108 and one or more destinations in telecommunications network 112. It will be understood that the distributed telecommunications switching system and method described herein may also be employed to route digital or analog information encoded in other formats, such as Transmission Control Protocol/Internet Protocol data packets.

In the following discussion, ATM cells being sent from ATM switch 110 through switching subsystems 102, 104, and 106 to CPE units 108, or any other destination in switching system 100, will be referred to as traveling in the downstream direction. Any cells sent from CPE units 108 through switching subsystems 102, 104, and 106 to ATM switch 110 will be referred to as traveling in the upstream direction.

Primary channel bank 102 communicates with ATM switch 110 by means of communication line 114 which carries ATM cells downstream from ATM switch 110 to primary channel bank 102. Primary channel bank 102 also communicates with ATM switch 110 by means of communication line 116 which carries cells upstream from primary channel bank 102 to ATM switch 110. In the preferred embodiment, communication lines 114 and 116 are fiber optic cables capable of carrying data at a standard OC-3 data rate.

Primary channel bank 102 comprises a controller 118 referred to as an ATM bank controller unit (ABCU) and a plurality of subscriber interface cards 120 referred to as asymmetric digital subscriber line (ADSL) cards. Controller 118 transmits cells downstream to subscriber interface cards 120 on a shared high speed cell bus 126. Subscriber interface cards 120, 122 and 124 transmit cells upstream to controller 118 via serial bus interface (SBI) lines 128, 130, and 132, respectively.

Controller 118 sends cells downstream to intermediate channel bank 104 via communication line 134, and receives cells traveling upstream via communication line 136. Communication lines 134 and 136, like lines 114 and 116, are preferably fiber optic cables capable of carrying data at the standard OC-3 data rate.

Downstream intermediate channel banks 104 and terminating channel bank 106 are similar in structure to primary channel bank 102, each having a controller 138 and 140, respectively, and a plurality of subscriber interface cards 120. Some differences in functionality among the channel banks will become apparent from the description to follow.

Figure 4:
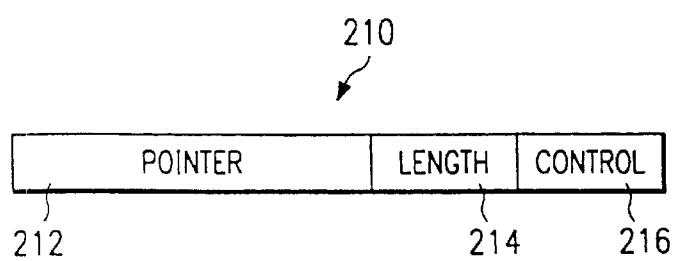
FIG. 4 is an illustration of a buffer descriptor array element.

Intermediate channel bank 104 may be directly coupled to terminating channel bank 106 by communication lines 142 and 144. Alternatively, one or more channel banks may be situated between intermediate channel bank 104 and terminating channel bank 106 in a "daisy chain" arrangement, with each channel bank being connected to the previous one by communication lines, as shown. Switching system 100 preferably comprises up to nine channel banks, as shown in FIG. 4. Regardless of the number of channel banks in switching system 100, terminating channel bank 106 is the last channel bank in the chain.

Each channel bank 102, 104, 106 may include up to 60 subscriber interface cards 120, with each subscriber interface card 120 communicating with up to four separate CPE units 108. The communication with CPE units 108 is asymmetric, with an exemplary data rate of six million bits per second (6 Mbps) supplied to the customer and 640 Kbps received from the customer. The type of service provided to the customer may be plain old telephone service (POTS), data service, or any other telecommunications service, and may or may not include a minimum cell rate (MCR) guaranteed for the customer's upstream data communications.

Generally, switching system 100 will be oversubscribed in the upstream direction, meaning that the cumulative peak cell rate (PCR) which may be transmitted by the customers exceeds the maximum rate at which switching system 100 may transmit cells to ATM switch 110. Control methods that allow switching system 100 to provide adequate service to oversubscribed customers will be discussed more fully below.

Figure 2:
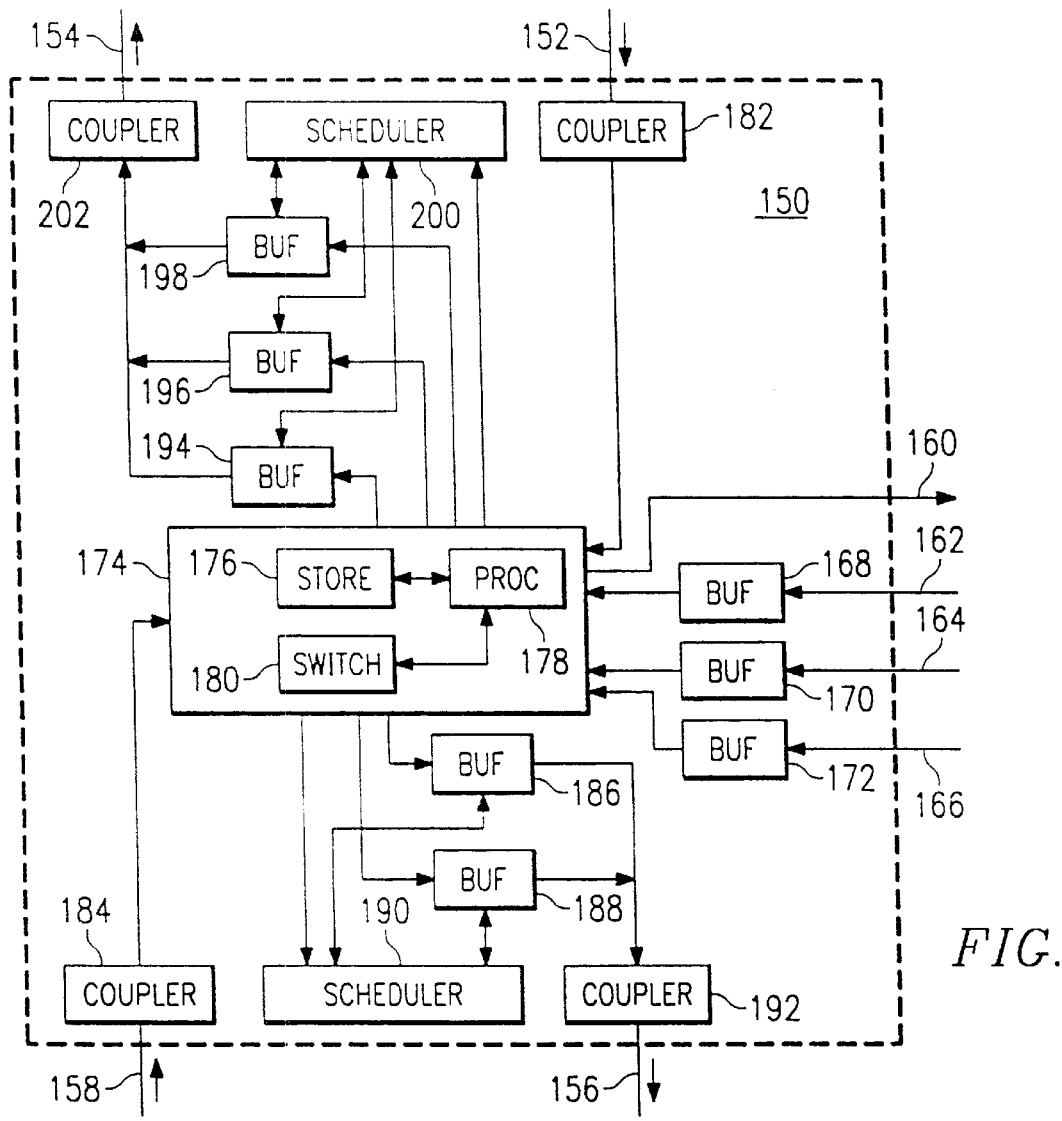
FIG. 2 is a block diagram of a controller for use in the distributed switching system.

Referring to FIG. 2, a functional block diagram of an upstream controller 150 in accordance with the invention is shown. Controller 150 may be implemented in switching system 100 as controller 118 or 138, or as a controller for another intermediate channel bank situated between intermediate channel bank 104 and terminating channel bank 106.

Controller 150 receives cells traveling downstream from ATM switch 110 or another controller in an upstream channel bank via fiber optic cable 152 and send cells upstream from a downstream channel bank via fiber optic cable 154. Controller 150 sends cells downstream to another channel bank via fiber optic cable 156 and receives cells upstream from a downstream channel bank via fiber optic cable 158.

Controller 150 transmits appropriate cells downstream to subscriber interface cards 120 on a shared high speed cell bus 160. When a large number of subscriber interface cards 120 are serviced by controller 150, high speed cell bus 160 may comprise a plurality of separate lines, each carrying the same high speed signal to a separate set of subscriber interface cards 120. For example, in a configuration with 60 subscriber interface cards being serviced by controller 150, high speed cell bus 160 may comprise three separate lines, each connected to 20 subscriber interface cards 120, but each carrying cells addressed to all of the subscriber interface cards 120.

Each subscriber interface card 120 sends cells upstream to controller 150 via a separate subscriber bus interface line 162, 164, or 166. In addition to carrying ATM traffic, subscriber bus interface lines 162, 164, and 166 may also carry telephone traffic from POTS subscribers. In that case, the POTS traffic may be separated out from the ATM traffic and processed by other equipment not shown. This separation occurs before the processing of ATM cells described herein. The downstream communication of POTS traffic to subscriber interface cards 120 may occur on lines other than high speed cell bus 160.

Buffers 168, 170 and 172 receive ATM signals on subscriber bus interface lines 162, 164 and 166, respectively, and store the received data until one or more complete cells are received. The cells are then passed on to an internal switching system 174, which comprises an address storage system 176, a processor 178, and a switch 180.

Address storage system 176 stores a list of addresses corresponding to the CPE units 108 serviced by controller 150. In the preferred embodiment, each address identifies a virtual path and virtual circuit for a CPE unit 108 in an addressing format well known to those skilled in the art of ATM communications. However, it will be appreciated that other addressing systems, such as Internet Protocol addressing, may be used to identify cell destinations both within and outside switching system 100.

Incoming signals on fiber optic cables 152 and 158 are converted to electrical signals by fiber optic couplers 182 and 184, respectively. The converted signals are transmitted to internal switching system 174.

Internal switching system 174 transmits cells downstream to a downstream channel bank via fiber optic cable 156. To accomplish this, cells are transmitted to a plurality of first in first out (FIFO) buffers or queues 186 and 188 controlled by a scheduler 190. When triggered by scheduler 190, each queue 186 or 188 dequeues one or more cells, transmitting the cells to a fiber optic coupler 192 which converts the data signals to optical signals for transmission over fiber optic cable 156.

Likewise, internal switching system 174 transmits cells upstream to an upstream channel bank or ATM switch 110 via fiber optic cable 154. To accomplish this, cells are transmitted to a plurality of FIFO queues 194, 196 and 198 controlled by a scheduler 200. When triggered by scheduler 200, each queue 194, 196, or 198 dequeues one or more cells, transmitting the cells to a fiber optic coupler 202 which converts the data signals to optical signals for transmission over fiber optic cable 154.

In operation, controller 150 receives downstream ATM cells from an upstream channel bank or ATM switch 110 on fiber optic cable 152. Processor 178 compares the address portion of a received cell to the list of addresses stored in address storage system 176. If a match is found, then switch 180 transmits the cell to the subscriber interface cards 120 associated with controller 150 on shared high speed cell bus 160.

All of the subscriber interface cards 120 associated with controller 150 check the address of the transmitted cell carried over high speed cell bus 160 and compare it to their internal address lists. Only the subscriber interface card 120 servicing the CPE unit 108 to which the cell is addressed reacts to receipt of the cell. All other subscriber interface cards ignore the cell.

Returning to controller 150, if the address of the cell did not match any of the addresses stored in address storage system 176, then processor 178 compares the address of the cell to a processor address to determine whether the cell is a control cell addressed to processor 178. If the address matches the processor address, then the control cell is processed by processor 178 in a manner to be described below.

If the cell address does not match any address for controller 150, then the cell is sent by switch 180 to a bypass queue 186. When bypass queue 186 receives a cell, it sends a ready signal to scheduler 190 which coordinates transmissions over fiber optic cable 156 to a next downstream channel bank. When scheduler 190 sends a transmit signal to bypass queue 186, the cell is transmitted to coupler 192 and onto fiber optic cable 156.

Processor 178 may also generate control cells for transmission to downstream channel banks, as will be described more fully below. When processor 178 generates such a cell, the cell is passed by switch 180 to CPU queue 188, which transmits a ready signal to scheduler 190. Scheduler 190 preferably controls both bypass queue 186 and CPU queue 188 to ensure that CPU queue 188 receives higher priority than bypass queue 186. This priority scheme may be implemented in a variety of ways. For example, bypass queue 186 may be allowed to dequeue a cell only when CPU queue 188 is empty. Because the frequency of control cells is low, this priority scheme does not significantly impede downstream traffic.

It will be appreciated by those skilled in the art that the downstream cell switching process executed by controller 150 differs from that of a telecommunications aswitching system arranged in a tree structure. Rather than storing addresses for all customers located downstream of controller 150, address storage system 176 only stores addresses corresponding to the customers directly serviced by controller 150. Any cell having an unrecognized address is passed downstream to another controller for processing. This allows for a smaller address storage system 176 and faster address processing in controller 150.

In the upstream direction, controller 150 receives ATM cells from downstream channel banks on fiber optic cable 158. Processor 178 compares the address portion of a received cell to its own address to determine whether the cell is a control cell addressed to processor 178. If the address matches the processor address, then the control cell is processed by processor 178 in a manner to be described below.

If the cell address does not match the processor address, then the cell is sent by switch 180 to a bypass queue 194. When bypass queue 194 receives a cell, it sends a ready signal to scheduler 200, which coordinates transmissions over fiber optic cable 154. When scheduler 200 sends a transmit signal to bypass queue 194, the cell is transmitted to coupler 202 and onto fiber optic cable 154.

If controller 150 is implemented in a downstream channel bank, i.e. a channel bank other than primary channel bank 102, then processor 178 may also generate control cells for transmission to upstream channel banks, as will be described more fully below. When processor 178 generates such a cell, the cell is passed by switch 180 to a CPU queue 196, which transmits a ready signal to scheduler 200. When scheduler 200 sends a transmit signal to CPU queue 196, the control cell is transmitted to coupler 202 and on to fiber optic cable 154.

Cells are received from the local CPE units 108 serviced by controller 150 on subscriber bus interface lines 162, 164, and 166. As previously noted, controller 150 may receive cells from up to 60 subscriber bus interface lines. Processor 178 checks the address portion of each cell to determine whether the cell is addressed to processor 178 itself or to a valid upstream destination.

The subscriber interface cards 120 controlled by controller 150 may, for example, send status feedback cells to processor 178 indicating whether traffic congestion is occurring in the subscriber interface cards 120. Processor 178 processes these status feedback cells accordingly.

Other cells addressed to valid upstream destinations are transmitted by switch 180 to ingress queue 198. Scheduler 200 controls bypass queue 194, CPU queue 196, and ingress queue 198 to implement a selected priority scheme. In the preferred embodiment, CPU queue 196 receives the highest priority, bypass queue 194 receives the next priority, and ingress queue 198 receives the lowest priority. As with scheduler 190, this priority scheme may be implemented in a variety of ways. For example, ingress queue 198 may be allowed to dequeue a cell only when CPU queue 196 and bypass queue 104 are both empty. Because the frequency of control cells is low, this priority scheme does not significantly impede upstream traffic.

It will be appreciated by those skilled in the art that the downstream cell switching process executed by controller 150 differs from that of a telecommunications switching system arranged in a tree structure. Rather than storing addresses for all customers located downstream of controller 150, address storage system 176 only stores addresses corresponding to the customers directly serviced by controller 150. Any cell having an unrecognized address is passed downstream to another controller for processing. This allows for a smaller address storage system 176 and faster address processing in controller 150.

In the upstream direction, controller 150 receives ATM cells from downstream channel banks on fiber optic cable 158. Processor 178 compares the address portion of a received cell to its own address to determine whether the cell is a control cell addressed to processor 178. If the address matches the processor address, then the control cell is processed by processor 178.

If the cell address does not match the processor address, then the cell is sent by switch 180 to a bypass queue 194. When bypass queue 194 receives a cell, it sends a ready signal to scheduler 200, which coordinates transmissions over fiber optic cable 154. When scheduler 200 sends a transmit signal to bypass queue 194, the cell is transmitted to coupler 202 and on to fiber optic cable 154.

If controller 150 is implemented in a downstream channel bank, i.e. a channel bank other than primary channel bank 102, then processor 178 may also generate control packets for transmission to upstream channel banks. When processor 178 generates such a packet, the packet is passed by switch 180 to a CPU queue 196 in a manner described more fully below.

Cells are received from the local CPE units 108 serviced by controller 150 on subscriber bus interface lines 162, 164 and 166. As previously noted, controller 150 may receive cells from up to 60 subscriber bus interface lines. Processor 178 checks the address portion of each cell to determine whether the cell is addressed to processor 178 itself, or to a valid upstream destination.

The subscriber interface cards controlled by controller 150 may, for example, send status feedback cells to processor 178 indicating whether traffic congestion is occurring in the subscriber interface cards. Processor 178 processes these status feedback cells.

Other cells addressed to valid upstream destinations are transmitted by switch 180 to ingress queue 198. Scheduler 200 controls bypass queue 194, CPU queue 196 and ingress queue 198 to implement a selected priority scheme. In the preferred embodiment, CPU queue 196 receives the highest priority, bypass queue 194 receives the next priority, and ingress queue 198 receives the lowest priority. As with scheduler 190, this priority scheme may be implemented in a variety of ways. For example, ingress queue 198 may be allowed to dequeue a cell only when CPU queue 196 and bypass queue 104 are both empty. Because the frequency of control packets is low, this priority scheme does not significantly impede upstream traffic.

It will be appreciated that the various elements of controller 150, excluding fiber optic couplers 152 through 158, generally perform data storage and signal processing functions, and may therefore be implemented as hardware, firmware, software, or some combination thereof.

Figure 3:
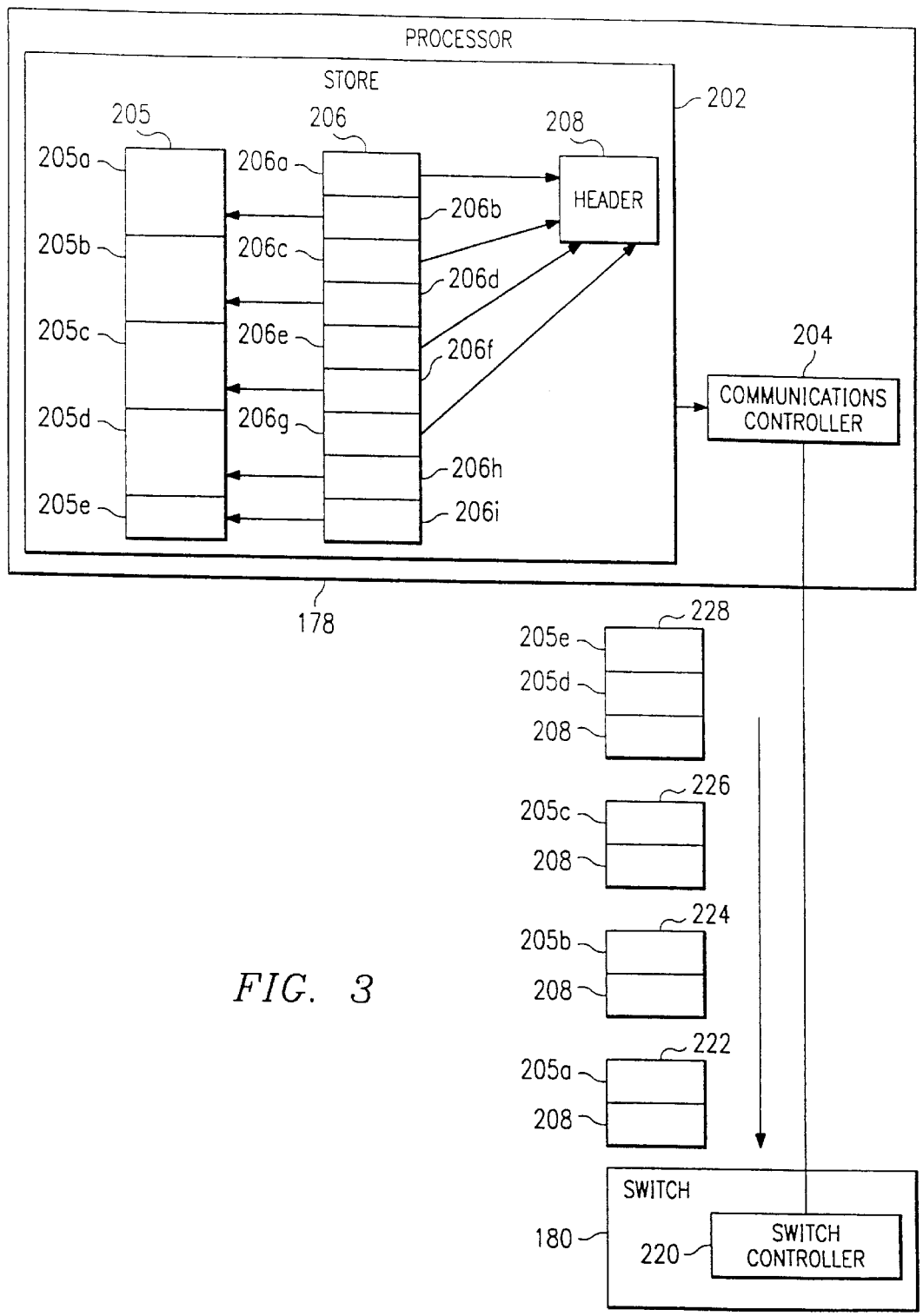
FIG. 3 is an expanded block diagram of a processor and switch for use in the controller.

Referring to FIG. 3, an expanded block diagram illustrating the communication between processor 178 and switch 180 of internal switching system 174 is shown. Processor 178 may be, for example, a Motorola MC68360 chip. Processor 178 comprises a memory block 202, referred to as "store," and a communication controller 204, which on the Motorola MC68360 chip is designated as "CP."

When processor 178 generates a control packet 205, the packet is passed to switch 180 in segments to conform to ATM Adaptation Layer 5 (AAL5) packet segmentation standards. To achieve this segmented packet transmission, processor 202 creates a buffer descriptor array 206 and a common cell header 208.

Control packet 205 comprises a plurality of segments 205a through 205e. Segments 205a through 205d represent the data content of control packet 205. Segment 205e may include a standard AAL5 trailer, cyclical redundancy check (CRC) bits, and other packet framing information. Common cell header 208 includes address information, such as virtual path and virtual circuit indicators, identifying the destination to which control packet 205 is to be sent.

Buffer descriptor array 206 comprises a plurality of elements 206a through 206i, each occupying eight eight-bit bytes of memory. An exemplary buffer descriptor array element 210 is shown in FIG. 4. Buffer descriptor array element 210 includes a pointer field 212, a length field 214 and a control field 216. Pointer field 212 indicates a point in store 202 where a segment of interest begins. Length field 214 indicates the length of the segment indicated by pointer field 212. Control field 216 may include an instruction to communication controller 204 concerning what action communication controller 204 is to take after the segment of interest has been transmitted to switch 180.

Returning to FIG. 3, buffer descriptor array elements 206a, 206c, 206e and 206g have pointer and length fields identifying the region of store 202 occupied by common cell header 208. Buffer descriptor array elements 206b, 206d, 206f, 206h and 206i each have pointer and length fields identifying a region of store 202 occupied by a respective control packet segment 205a through 205e, respectively.

The control fields of buffer descriptor array elements 206a through 206h each instruct communication controller 204 to continue on to the next element of buffer descriptor array 206 after the transmission of each element. The control field of buffer descriptor array element 206i includes an instruction to interrupt processor 178 after transmission of the last control segment packet 205e, indicating the completed transmission of control packet 205.

After creating buffer descriptor array 206 as described, processor 202 passes to communication controller 204 a pointer indicating the region of store 202 where buffer descriptor array 206 begins. Communication controller 204 then sends to a switch controller 220 of switch 180 a "request-to-send" signal. Switch controller 220 responds to the "request-to-send" by sending a "clear-to-send" signal to communication controller 204. In response, communication controller 204 begins transmitting to switch controller 220 the segments indicated by buffer descriptor array 206.

Thus, a series of cells 222, 224, 226, 228, each comprising common cell header 208 and a respective segment of control packet segment 205, are transmitted to switch controller 220. Cell 228 also includes control packet segment 205e, containing the AAL5 trailer, CRC bits, and other packet framing information. Switch controller 220 is operable to read the cell headers 208 and cause switch 180 to send control cells 222 through 228 to the appropriate destination.

This method of segmenting and transmitting control packet 205 has significant advantages over known packet transmission methods. First, no additional copies of control packet 205 are created in store 202 to transmit the packet. Second, communication controller 204 performs the bulk of the work in transmitting control packet 205, leaving the rest of processor 178 free to execute other instructions.

While the invention has been particularly shown and described by the foregoing detailed description, it will be understood by those skilled in the art that various other changes in form and detail may be made without departing from the spirit and scope of the invention.

What is claimed is:

1. A data packet transmission system, comprising:
   a memory block having a data packet, a header, and a buffer descriptor array stored therein, the data packet having a plurality of segments, the buffer descriptor array having a first and second plurality of elements, each one of the first plurality of elements having a pointer indicating the header, and each one of the second plurality of elements having a pointer indicating a respective segment of the data packet; and
   a communication controller operable to receive an indication of a location of the buffer descriptor array, and operable to transmit the data packet to a destination device in response to the indication of the location of the buffer descriptor array.

2. The data packet transmission system of claim 1, wherein the indication of the location of the buffer descriptor array comprises a memory address pointer.

3. The data packet transmission system of claim 1, wherein each one of the first plurality of elements of the buffer descriptor array further comprises a length field indicating a length of the header.

4. The data packet transmission system of claim 1, wherein the header comprises cell destination information.

5. The data packet transmission system of claim 4, wherein the cell destination information comprises a virtual path indicator and a virtual circuit indicator.

6. The data packet transmission system of claim 1, wherein a selected one of the segments of the data packet comprises error checking information.

7. A data packet transmission system, comprising a processor having a memory block and a communication controller, the processor being operable to store a data packet, a buffer descriptor array, and a header in the memory block, the buffer descriptor array having a first plurality of elements each indicating a respective segment of the data packet, the buffer descriptor array having a second plurality of elements each indicating the header, the processor being operable to supply a signal indicating a location of the buffer descriptor array to the communication controller, the communication controller being operable to transmit the data packet to a destination system in response to receiving the signal.

8. The data packet transmission system of claim 7, wherein the communication controller is further operable to transmit to a destination system a request-to-send signal and to receive from the destination system a clear-to-send signal.

9. A method for transmitting data from a processor to a destination device, comprising the steps of:

storing in a memory block of the processor a buffer descriptor array having a plurality of elements, each element indicating a selected one of the data packet segments:

receiving at a communication controller of the processor a signal indicating a location of the buffer descriptor array;

transmitting from the communication controller to the destination device the data packet segments indicated by the buffer descriptor array elements:

storing a header in the memory block of the processor; and transmitting from the communication controller to the destination device the header; and wherein the step of storing the buffer descriptor array comprises the step of storing in the buffer descriptor array a second plurality of elements, each indicating the header.

10. The method of claim 9, further comprising the steps of:

transmitting to the destination device a request-to-send signal; and receiving at the processor from the destination device a clear-to-send signal; and wherein the step of transmitting the data packet segments is performed in response to the clear-to-send signal.

11. A method for transmitting data from a processor to a destination device, comprising the steps of:

storing a data packet in a memory block of the processor;

storing a header in the memory block of the processor;

storing in the memory block of the processor a buffer descriptor array having a first plurality of elements and a second plurality of elements alternating with the first plurality of elements, each one of the first plurality of elements indicating the header, and each one of the second plurality of elements indicating a corresponding segment of the data packet;

transmitting to a communication controller of the processor a pointer having an address of the buffer descriptor array; and transmitting by the communication controller to the destination device, in response to the pointer, the header and the segments of the data packet.

12. The method of claim 11, wherein the step of transmitting the header and the segments of the data packet comprises the step of transmitting a plurality of cells, each cell comprising the header and a respective one of the segments of the data packet.

13. The method of claim 11, further comprising the steps of:

transmitting to the destination device a request-to-send signal; and receiving at the processor from the destination device a clear-to-send signal; and wherein the step of transmitting the data packet segments is performed in response to the clear-to-send signal.

14. The method of claim 11, wherein the step of storing the header in the memory block of the processor comprises the step of storing virtual path and virtual circuit indicators in the memory block of the processor.

* * * * *